United States Patent [19]

Harcuba

[11] Patent Number: 4,684,342
[45] Date of Patent: Aug. 4, 1987

[54] METHOD AND APPARATUS FOR THE THERMAL TREATMENT OF A BATCH OF RAW MATERIAL

[76] Inventor: Siegfried Harcuba, Höhenstrasse 96, A-6020 Innsbruck, Austria

[21] Appl. No.: 832,121

[22] Filed: Feb. 20, 1986

[30] Foreign Application Priority Data

Feb. 22, 1985 [AT] Austria .................................. 539/85

[51] Int. Cl.⁴ ............................................. F27B 7/36
[52] U.S. Cl. .................................... 432/103; 432/105; 432/112; 432/113; 432/117; 65/27
[58] Field of Search ............... 432/103, 105, 107, 112, 432/113, 114, 117; 65/27, 136

[56] References Cited

U.S. PATENT DOCUMENTS

| | | | |
|---|---|---|---|
| 1,938,832 | 12/1933 | Hougen et al. | 432/114 |
| 1,995,948 | 3/1935 | Shafter et al. | 432/113 |
| 2,869,849 | 1/1959 | Folliot et al. | 432/119 |
| 3,407,511 | 10/1968 | Camm | 432/110 |
| 4,146,975 | 4/1979 | Duhem | 432/107 |
| 4,376,343 | 3/1983 | White et al. | 432/112 |
| 4,398,826 | 8/1983 | Mendenhall | 432/105 |
| 4,427,376 | 1/1984 | Etnyre et al. | 432/111 |
| 4,519,814 | 5/1985 | Demarest et al. | 432/117 |

Primary Examiner—Henry C. Yuen
Attorney, Agent, or Firm—Karl F. Ross; Herbert Dubno

[57] ABSTRACT

An apparatus for the thermal treatment of a batch of raw material has a casing and a drum rotatably mounted in the casing, the drum being made of good thermally conductive material and being substantially closed off from the open atmosphere. A drive is provided for rotating the drum and a feeder can introduce a bath of raw material into the drum and a device is provided for discharging a said batch which has been heated in the drum. A conduit conveys hot gases in heat exchange relationship with the drum.

5 Claims, 2 Drawing Figures

METHOD AND APPARATUS FOR THE THERMAL TREATMENT OF A BATCH OF RAW MATERIAL

FIELD OF THE INVENTION

This invention relates to a method and apparatus for the thermal treatment of a batch of raw material, e.g. a glass batch which is to be pre-heated before its introduction into a glass melt.

BACKGROUND OF THE INVENTION

It is known to heat a raw material batch for glass production before its introduction into the glass melt. The purpose of this heating is to bind the dust-like components in said raw material batch so as to prevent the dust-like components from being carried away by the combustion gases or by the flue gases upon introduction into the melting unit, whereby the aggressiveness of these gases is increased. Furthermore, the composition of the batch is changed by the dust entrainment and, addition, the regenerators and recuperators are contaminated with dust, greatly impairing their efficiency.

A rotatable drum is known through which a raw material batch is passed and in which it is heated before its introduction into a glass melt. As the heating in this case is performed by an additional burner, this causes a high energy expenditure. In addition, there is the risk that dust-like components will still be carried away by the flue gases, changing the composition of the batch. Furthermore, this may also cause solids reactions.

Also known, from German Patent Specification No. 865,644, is a rotatable drum in which a raw material batch is heated by an electrical heating element before its introduction into the glass melt. Even if some of the disadvantages listed above are avoided by this system, there remains the requirement that a separate heat source be provided, which causes an additional energy expenditure.

Also known, from German Patent Specification No. 457,087, is a melting furnace which is designed as a rotary drum. In a first stage of the melting operation, the burning gases, which can cause damage to the raw material batch are carried away through a pipe arranged inside the drum. However, German Patent Specification No. 457,087 does not relate to a device for the thermal treatment of the raw material batch before its introduction into the glass melt but rather to a melting device which is supplied with a batch which has not been previously thermally treated.

OBJECT OF THE INVENTION

The object of the present invention is to provide a method and apparatus for the thermal treatment of a raw material batch before its introduction into a glass melt, such that the disadvantages from which the prior art suffers are avoided.

SUMMARY OF THE INVENTION

This object is attained by the present invention, according to which there is provided an apparatus for the thermal treatment of a batch of raw material comprising a casing; a drum rotatably mounted in the casing, the drum being made of good thermally conductive material and being substantially closed off from the open atmosphere; means for rotating the drum; means for introducing a batch of raw material into the drum; means for discharging a said batch which has been heated in the drum; and conduit means for conveying hot gases in heat exchange relationship with the drum.

The conduit means may comprise a pipe which passes axially through the drum.

In this case, the inner surface of the pipe is preferably provided with projections which enlarge the heat-absorbing surface of the pipe.

Alternatively or additionally the conduit means may comprise a flow channel defined between the outer circumferential surface of the drum and an adjacent surface of the casing.

The outer circumferentialsurface of the drum may be provided with projections which enlarge its heat-absorbing surface.

The casing may have an inner wall which surrounds the drum, the said inner wall having projections which extend into the said flow channel so as to cause turbulent flow therein.

The drum is preferably provided with first and second fixed end walls which are sealed with respect to the drum.

The first fixed end wall may be provided with the means for introducing a batch of raw material into the drum.

The means for discharging the batch may be provided adjacent the second fixed end wall. The means for discharging the batch may, moreover, comprise a chute which extends to a glass melt tank.

The invention also comprises a method of thermally treating a batch of glass in raw material form comprising introducing the batch into a rotatable drum which is substatially closed off from the open atmosphere, rotating the drum, heating the drum by means of hot gases from a glass melt, and discharging the batch which has been heated in the drum so that it passes into the glass melt.

The temperature to which the raw material batch is heated depends on the particular composition of the batch. In particular, the heating of the raw batch in the drum may effect approximately half of the silicate formation.

The arrangement may be such that, on account of directing elements arranged in the drum, the rotation of the drum causes the raw material batch to be conveyed in an axial direction. In this case, owing to the movement of the batch, the air trapped in the batch escapes and, because of the increasing temperature of the batch during its passage through the drum, the individual constituents of the batch react increasingly, whereby some of the silicate formation has been performed in the batch by the time it is discharged from the drum. As the drum is substantially closed off and no gases are passed through it, no dust-like components of the raw material batch can escape from the drum or be carried off by gas flows. As the raw material batch is heated by the gases occurring in the glass melting process, no separate energy source is necessary. Instead, the hot gases available from the melting process can be used without disadvantage.

Preferably, as indicated above, the outer surface of the drum or the inner surface of the pipe passing through the drum are designed with profiled portions or projections, e.g. with ribs, which serve to enlarge the heat-absorbing surfaces. In addition, as indicated above, profiled portions or projections may be provided on the inner wall of the casing surrounding the drum, as a result of which turbulent flows are effected in the flow channel formed between the drum and the casing. The rotatable drum itself may, as indicated above, be designed with fixed end walls, sealed off from the drum, a first end wall having a conveying mechanism passing through it for charging the inside of the drum with raw material batch, while a chute, which extends to a glass melt tank, may be provided in the region of the second end wall.

BRIEF DESCRIPTION OF THE DRAWING

The invention is illustrated, merely by way of example, in the accompanying drawing in which.

SPECIFIC DESCRIPTION

Figure 1:
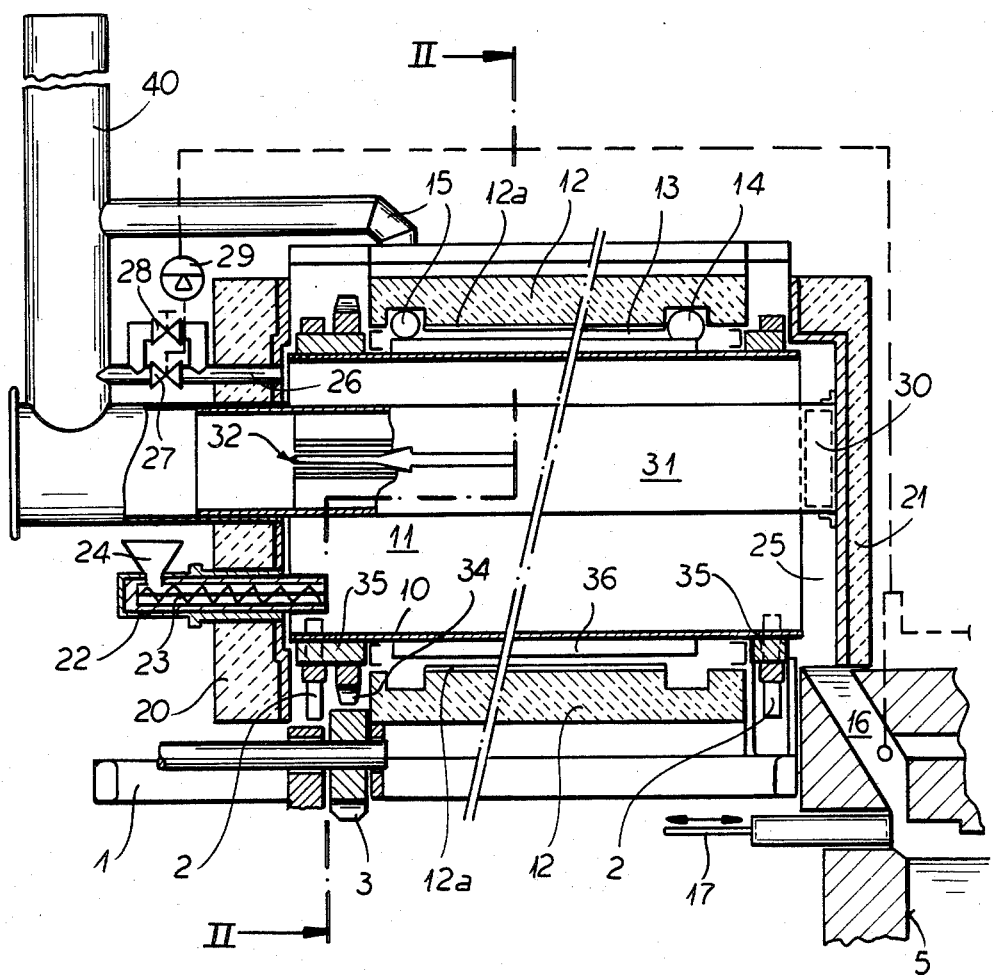
FIG. 1 shows an apparatus according to the present invention for the treatment of a batch of raw material, in axial longitudinal section.
Figure 2:
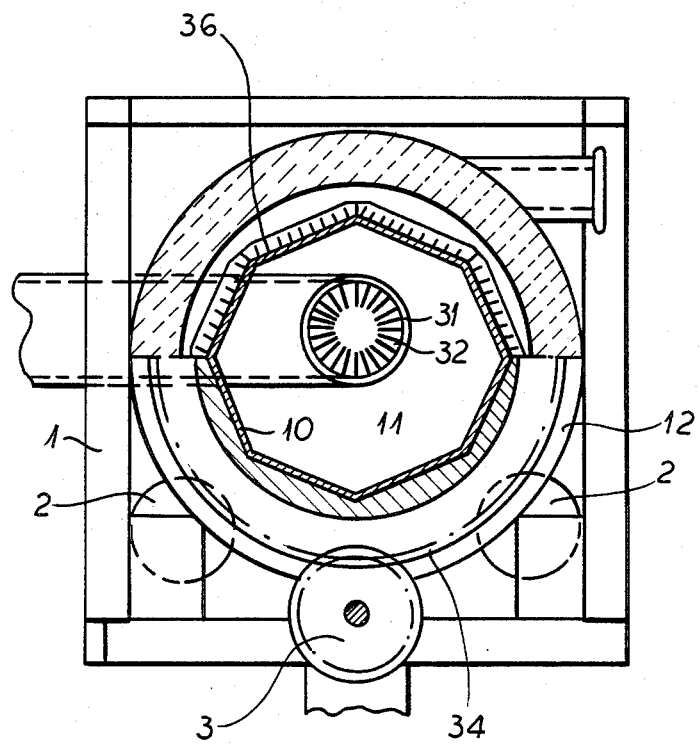
FIG. 2 shows a section along the line II—II of FIG. 1.

Apparatus according to the present invention for the treatment of a batch of raw material has a support rack 1 on which rollers 2 and a drive gearwheel 3 are mounted for rotatably supporting a drum 10. The outer jacket of the drum 10 is provided with travelling rims which are mounted on the rollers 2. Meshing with the gearwheel 3 is a gear ring 34 which is also arranged on the outer jacket of the drum 10.

At its ends, the drum 10 is closed off by a first fixed end plate 20 and by a second fixed end plate 21. The first fixed end plate 20 has a pipe 22 passing through it, a conveying screw 23 being disposed within the pipe 22. Furthermore, the first fixed end plate 20 has a gas vent pipe 26 passing through it, the gas vent pipe 26 extending into the inside 11 of the drum 10 and leading via valves 27, 28 to a vent pipe 40. The second fixed end plate 21 is located at a little distance from the associated end edge of the drum 10, whereby a gap 25 is formed. A chute 16 is disposed adjacent to and in communication with the gap 25, the chute 16 leading to a gas melt tank 5. The chute 16 can be shut off by a slid.er 17. Provided in the side wall of the second fixed end plate 21 is a lateral pipe connection 30 which leads to a pipe 31. The pipe 31 passes axially through the drum 10 and is held at one end by the second fixed end plate 21, the pipe 31 passing through the first fixed end plate 20 and communicating with the vent pipe 40.

The outer jacket of the drum 10 is surrounded by and spaced from a fixed insulating casing 12, an annular channel 13 being formed between the casing 12 and the external wall of the drum 10. A supply line 14, which is mounted adjacent to the second fixed end plate 21, communicates with the annular channel 13 so that hot gases can be supplied to the annular channel 13 by way of the supply line 14. Adjacent to the first fixed end plate 20 there is an outlet pipe 15 which leads to the vent pipe 40, the outlet pipe 15 communicating with the annular channel 13.

The fixed end plates 20, 21 are made of highly insulating, ceramic fiber material and are provided on their wall facing the inside 11 of the drum 10 with a cladding of non-scaling steel. The casing 12 is likewise made of highly heat insulating ceramic fiber material, being clad on its inside with sheet steel and on its outside with sheet aluminum. The drum 10 which is made of good, thermally conductive material, may be made, for example, of a malleable cast iron containing Si, Cr and Ni, preferably has a thermal conductivity of 50 kCal/mh° C. and preferably has a surface hardness of 400 HB (Brinell).

On the outer circumferential surface of the drum 10 there are ribs 36 extending in the axial direction, the ribs 36 enlarging the heat-absorbing surface of the drum 10. On the inside of the casing 12 there are ribs which are not shown in the drawing and which run approximately annularly along this wall. Furthermore, the inner wall of the pipe 31 passing through the drum 10 is likewise designed with longitudinally extending ribs 32 or other projections which enlarge the heat-absorbing surface of the pipe 31. Seals are provided between the first fixed end plate 20 or the casing 12 and the base of the gear ring 34, the seals being formed, for example, by graphite rings. In the same way, seals in the form of graphite rings are arranged between the casing 12 or the second fixed end plate 21 and the base of the travelling rims 35. Furthermore, directing elements running obliquely or spirally, for example, are arranged on the inside wall of the drum 10, their function being explained in more detail below.

The mode of operation of the apparatus described above is as follows. A raw material batch for glass production is fed via a filling hopper 24 to the pipe 22 and is introduced via the screw 23 into the inside 11 of the drum 10. The drum 10 is set in rotation by means of the gearwheel 3 which meshes with the gear ring 34. Furthermore, hot gases occurring during glass melting are introduced through the lateral pipe connection 30 into the pipe 31 which passes through the drum 10. The hot gases flow through the pipe 31 and reach the vent pipe 40. These hot gases heat the pipe 31, whereby it radiates heat into the inside 11 of the drum 10. The heat absorption capacity of the pipe 31 is increased by the ribs 32 provided on its inner wall. In a similar way, hot gases coming from the glass melt tank are also introduced into the annular channel 13 via the supply line 14, these hot gases flowing along the outside wall of the drum 10 and being carried away from the annular channel 13 through the pipe 15, whereby they pass to the vent pipe 40. These hot gases also heat the wall of the drum 10, whereby the latter radiates heat inwards. As the outside wall of the drum 10 is provided with projections constituted by the ribs 36, and as the inside wall of the casing 12 is provided with projections 12a which almost cross the ribs 36, turbulent formations occur in the gases flowing in the annular channel 13, whereby an optimization of the heat transfer to the drum 10 is effected.

Consequently, the raw material batch located in the inside 11 of the drum is subjected to heat both from its upper side and from its lower side. On account of the rotation of the drum 10, the batch is circulated. In this process, it sides along the wall of the drum 10, being conveyed in the axial direction from the first fixed end plate 20 to the second fixed end plate 21 on account of directing elements (not shown) provided within the drum 10. The movement of the raw material batch can cause air trapped therein to escape. Furthermore, the heating of the raw material batch will cause moisture therein to be driven out. Moreover, solids reactions occur increasingly, whereby a partial silicate formation takes place. Once the raw material batch has passed through the drum 10, it goes through the gap 25 into the chute 16, from where it goes into the glass melt located in the glass tank 5.

The air or moisture escaping from the batch treated in the drum 10 is fed via the pipe 26 and via the valves 27 and 28 to the vent pipe 40. In a further line, a filtering bag 29 may be arranged.

As the heating of the raw material batch takes place without hot gases streaming over it and in particular as the drum 10 is very substantially closed off from the open atmosphere, the carrying away of dust-like components from the material batch, which may lead to damage of the downstream sections of the plant, is avoided. Nevertheless, the thermal treatment of the raw material batch aimed for is achieved without any additional heat source being necessary for this.

I claim:

1. An apparatus for preheating a batch of glass-making raw material, comprising:

a casing composed of a thermally insulating material and having a cylindrical wall, a pair of end walls, and, adjacent one of said end walls, a chute formed in said cylindrical wall and leading to a glass-melting furnace;

an open-ended drum composed of a material of high thermal conductivity rotatable in said casing and having an end spaced from said one of said end walls for discharging glass-making raw material preheated in said drum into said chute for feeding to said glass-melting furnace, said drum having at least one heat-exchange surface;

seal means associated with said drum for preventing substantial gas flow therethrough into direct contact with said glass-making raw material therein;

a duct passing generally axially through said drum, secured to said casing and formed with at least one heat-exchange surface through which indirect heat exchange is effected between a heating gas axially traversing said duct and the glass-making raw material in said drum, said duct being provided at one end thereof with an inlet for said heating gas and at an opposite end thereof with an outlet for discharging said gas at least one of said surfaces being provided with projections promoting the indirect heat exchange;

feed means traversing the other of said walls and extending into said drum for depositing said glass-making raw material to be preheated therein; and drive means connected to said drum for rotating same while said heating gas is passed through said duct to preheat the glass-making raw materials introduced into said drum through said drive means indirectly with said gas and discharge the preheated glass-making raw material into said chute.

2. The apparatus defined in claim 1 wherein said heat exchange surface of said duct is formed with said projections and is an inner surface of said duct.

3. The apparatus defined in claim 1 wherein said duct is provided with said inlet at an end of said duct proximal to said one of said end walls and is formed with a vent after traversing said other wall at said opposite end of said duct, said vent constituting said outlet for discharging said gas, said drum defining with said cylindrical wall a flow channel, means being provided to feed said flow channel with said heating gas proximal to said one of said end walls, and for connecting said flow channel to said vent proximal to said other end wall.

4. The apparatus defined in claim 1 wherein said drum has an outer surface formed with said projections and extending into said channel.

5. The apparatus defined in claim 4 wherein said casing has an inner wall in part defining said channel and formed with turbulence-producing projections therein.

* * * * *